United States Patent [19]
Matsunaga et al.

[11] Patent Number: 5,609,930
[45] Date of Patent: Mar. 11, 1997

[54] BAG FOR PACKAGING HEAVY MATERIALS

[75] Inventors: Takashi Matsunaga; Toshihiro Nishimura; Hiroshi Inoue, all of Chiba-ken, Japan

[73] Assignee: Mitsui Petrochemical Industries, Ltd., Tokyo, Japan

[21] Appl. No.: 418,376

[22] Filed: Apr. 7, 1995

[30] Foreign Application Priority Data

Apr. 7, 1994 [JP] Japan .................................. 6-069767

[51] Int. Cl.$^6$ ................................................. B65D 33/02
[52] U.S. Cl. .................. 428/35.2; 428/143; 428/516; 428/212; 428/35.7; 428/331; 428/213; 428/330; 428/216; 383/32; 383/35; 206/554
[58] Field of Search ........................... 383/32, 35, 116; 428/35.2, 36.91, 143, 147, 212, 213, 216, 516, 330, 331, 35.7; 206/554, 819

[56] References Cited

U.S. PATENT DOCUMENTS

| 3,246,831 | 4/1966 | Teicher | 383/32 |
|---|---|---|---|
| 4,085,851 | 4/1978 | Young | 206/554 |
| 4,318,950 | 3/1982 | Takashi et al. | 428/143 |
| 5,013,290 | 5/1991 | DeMatteis | 493/196 |
| 5,129,735 | 7/1992 | Neal et al. | 383/32 |
| 5,248,040 | 9/1993 | DeMatteis et al. | 206/554 |
| 5,250,612 | 10/1993 | Hazlitt et al. | 428/516 |
| 5,497,884 | 3/1996 | DeMatteis et al. | 206/554 |

FOREIGN PATENT DOCUMENTS

| 0095299 | 11/1983 | European Pat. Off. . |
|---|---|---|
| 0103942 | 3/1984 | European Pat. Off. . |
| 0353496 | 2/1990 | European Pat. Off. . |
| 0359440 | 3/1990 | European Pat. Off. . |
| 0507351 | 10/1992 | European Pat. Off. . |
| 55-110140 | 8/1980 | Japan . |
| 56-092023 | 7/1981 | Japan . |
| 7033151 | 2/1995 | Japan . |
| WO93/07210 | 4/1993 | WIPO . |

*Primary Examiner*—Ellis Robinson
*Assistant Examiner*—Chris S. Kyriakou
*Attorney, Agent, or Firm*—Birch, Stewart, Kolasch & Birch, LLP

[57] ABSTRACT

A bag for packaging heavy materials, exhibiting excellent strength, content packaging performance, stacking performance on the pallets, and anti-collapsing performance. The bag is made of a multi-layer laminated film which comprises an outermost layer of a polyethylene film containing an inorganic filler in an amount of from 20 to 80% by weight and an innermost layer of a polyethylene film containing an inorganic filler in an amount of from 10 to 40% by weight, the outermost layer having on the surface thereof a coefficient of static friction of not smaller than 0.5 (ASTM D 1894), a coefficient of dynamic friction of not larger than 0.5 (ASTM D 1894) and a gloss of not larger than 50% (JIS Z 8741, at a measuring angle of 60°), and the content of the inorganic filler in the innermost layer being from ½ to ⅙ of the content of the inorganic filler in the outermost layer.

5 Claims, 1 Drawing Sheet

BAG FOR PACKAGING HEAVY MATERIALS

BACKGROUND OF THE INVENTION i) Field of the Invention

The present invention relates to a bag for packaging heavy materials. More specifically, the invention relates to a bag for packaging heavy materials, which is made of an inorganic filler-containing multi-layer polyethylene film, and exhibits excellent strength, content packaging performance, stacking performance on the pallets and anti-collapsing performance in combination.

ii) Description of the Prior Art

Bags made of a polyethylene film having a thickness of about 100 µm to 250 µm have been widely used for packaging heavy materials such as fertilizers, grains such as rice and the like, chemicals, etc. in amounts of 5 kg to 30 kg. Such contents are usually packaged in the bags by using a machine. In this case, however, the contents will not be easily packaged in the bags if the bags are not favorably opened or exhibit poor rigidity and poor slipping property. Therefore, the bags must exhibit slipping property on the inner surfaces thereof.

The bags packing the contents are stacked on the pallets. To stack the bags, it is desired that the bags exhibit slipping property to some extent on the outer surfaces thereof. After the bags have been stacked, the outer surfaces of the bags must become little slippery, so that the stacked bags are not collapsed while the pallets are being moved or during the storage. With respect to slipping property on the outer surfaces of the bags, as described above, conflicting properties are required depending upon the steps.

In recent years, furthermore, packaging and stacking operations have been carried out at increased speeds for better efficiency, and the above-mentioned properties on the inner surfaces and outer surfaces of the bags have been more desired than ever before.

To meet such requirements, attempts have been made to add a slipping agent, an antistatic agent and the like agents in proper amounts to the resins constituting the film when the bags are made of a single-layer film without, however, succeeding in obtaining bags that satisfy the above-mentioned conflicting properties.

Accordingly, efforts have been made to develop bags made of a multi-layer film by changing the amounts of additives and the thicknesses of the layers. For example, Japanese Patent Publication No. 25135/1992 discloses a bag made of a three-layer film comprising an outer layer, an inner layer and an intermediate layer having a ratio that lies within a particular range, and in which a slipping agent is added to the outer layer and to the inner layer. However, the slipping agent abruptly exhibits its effects when it is added in a given amount, and it is very difficult to so adjust the amount of addition of the slipping agent that slipping property of a proper level is obtained. In the bags made of a multi-layer film, furthermore, the slipping agent migrates in the layers and, hence, the effect of the slipping agent changes with the passage of time, which makes it difficult to maintain the slipping property at a suitable level over extended periods of time.

Japanese Patent Publication No. 57223/1988 discloses a bag made of a two-layer film which is made up of two layers of resins of different kinds. However, this bag has the outermost layer exhibiting low slipping property which helps prevent the stack of bags from collapsing but arouses such problems that the contents are not packaged as desired and that the bags are not well stacked.

SUMMARY OF THE INVENTION

In order to solve the above-mentioned problems, the present invention provides a bag for packaging heavy materials, which has excellent strength and suitable slipping property that enables the contents to be packaged at high speed, enables the bags to be stacked at high speeds, and prevents the bags from collapsing while the bags are being moved at high speeds or during the storage.

According to the present invention, there is provided a bag for packaging heavy materials made of a multi-layer laminated film comprising an outermost layer of a polyethylene film containing an inorganic filler in an amount of from 20 to 80% by weight and an innermost layer of a polyethylene film containing an inorganic filler in an amount of from 10 to 40% by weight, the outermost layer having on the surface thereof a coefficient of static friction of not smaller than 0.5 (ASTM D 1894), a coefficient of dynamic friction of not larger than 0.5 (ASTM D 1894) and a gloss of not larger than 50% (ASTM D 523-80), the content of the inorganic filler in the innermost layer being from ½ to ⅙ of the content of the inorganic filler in the outermost layer.

According to the present invention, furthermore, there is provided a bag for packaging heavy materials made of a multi-layer polyethylene film of at least two layers, the outermost layer having a thickness of from 15 to 60 µm and, particularly, from 20 to 40 µm and containing an inorganic filler in an amount of from 20 to 80% by weight and, particularly, from 25 to 70% by weight, the innermost layer having a thickness of not smaller than 45 µm and containing an inorganic filler in an amount of from 10 to 40% by weight, which is from ½ to ⅙ and, particularly, from ½ to ¼ the amount of the inorganic filler of the outermost layer, and the ratio of the thickness of the innermost layer/thickness of the outermost layer being from 3 to 8 and, particularly, from 3 to 6.

DETAILED DESCRIPTION OF THE PREFERRED EMBODIMENT

Figure 1:
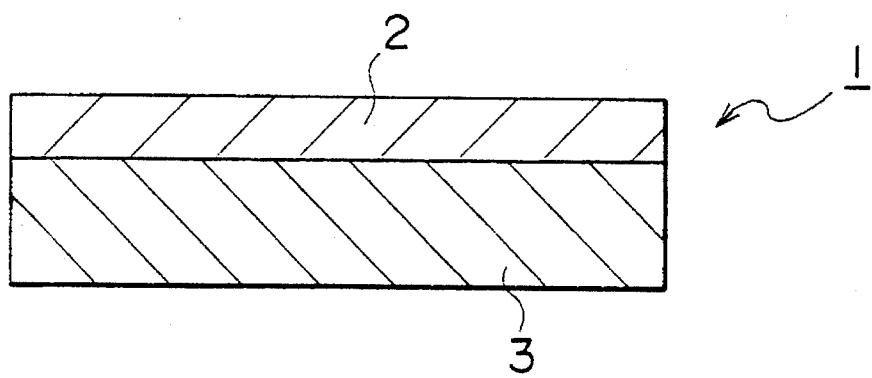
FIGS. 1 and 2 are sectional views of some examples of multi-layer polyethylene films constituting bags for packaging heavy materials according to the present invention.

Referring to FIG. 1, a multi-layer polyethylene film 1 constituting a bag for packaging heavy materials of the present invention comprises a laminate of a polyethylene film 2 which is an outermost layer containing an inorganic filler at a relatively high concentration and a polyethylene film 8 which is an innermost layer (layer of the side contacting to the contents) containing the inorganic filler at a relatively low concentration.

Figure 2:
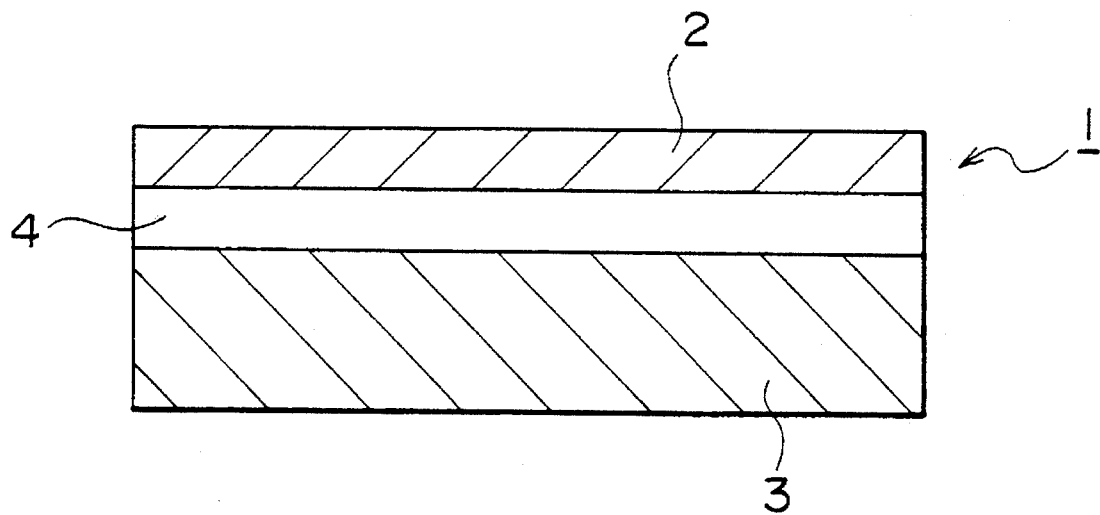

In the example shown in FIG. 1, the multi-layer film 1 comprises two layers, i.e., the outermost layer 2 and the innermost layer 8. As shown in FIG. 2, however, another resin layer 4 such as a polyethylene layer without blended with inorganic filler may be interposed between the outermost layer 2 and the innermost layer 8.

The outermost layer 2 is to impart performance for being stacked on the pallet in a state where the contents are packaged in the bags and to impart performance for preventing the bags that are stacked from collapsing. The outermost layer 2 comprises a polyethylene composition containing an inorganic filler in an amount of from 20 to 80% by weight and, particularly, from 25 to 70% by weight, and has on the outer surface thereof a coefficient of static friction of not smaller than 0.5 and, preferably, not smaller than 0.55 and a coefficient of dynamic friction of not larger than 0.5 and, preferably, not larger than 0.48 as measured in compliance with ASTM D 1894. It is desired that the difference between the coefficient of static friction and the coefficient of dynamic friction is not smaller than 0.03 and, particularly, not smaller than 0.07.

According to the present invention as described above, the inorganic filler is contained in the above-mentioned amount in the outermost layer to form microscopic ruggedness in the outer surface of the film, whereby slipping property of the outer surface is maintained at a suitable level. Accordingly, the bag exhibits conflicting properties; i.e., the contents can be easily packaged and the bags can be easily stacked yet preventing the stacked bags from collapsing. When the content of the inorganic filler in the outermost layer becomes smaller than the above-mentioned lower limit, it becomes difficult to control the slipping property; i.e., the bags can be favorably stacked but tend to be collapsed. When the inorganic filler is contained in an amount in excess of the above-mentioned upper limit, the bag loses the strength.

The coefficient of static friction is related to collapsing. The larger the coefficient of static friction, the less the collapse of bags. On the other hand, the coefficient of dynamic friction is related to packaging performance and stacking performance. The smaller the coefficient of dynamic friction, the better the packaging performance and stacking performance. When microscopic ruggedness is not formed in the outer surface, the coefficient of static friction and the coefficient of dynamic friction become nearly equal to each other (the coefficient of dynamic friction may be slightly smaller). Therefore, packaging performance, stacking performance and anti-collapsing performance are not accomplished simultaneously. When microscopic ruggedness is formed, on the other hand, the coefficient of static friction increases and the coefficient of dynamic friction decreases, whereby the difference between the two increases making it possible to accomplish the above-mentioned conflicting performances.

When the coefficient of static friction becomes smaller than the above-mentioned lower-limit value, the stacked bags tend to be collapsed and when the coefficient of dynamic friction exceeds the above-mentioned upper-limit value, the packaging performance and stacking performance are deteriorated. In either case, the above-mentioned conflicting performances are not accomplished. When the gloss lies within the aforementioned range, furthermore, the conflicting performances are well-balanced.

The coefficient of static friction, coefficient of dynamic friction and the gloss can be adjusted by selecting the kind of the inorganic filler, particle diameters and the amounts to be contained.

Unlike the slipping property imparted by adding a slipping agent as done in the prior art, the slipping property adjusted by the addition of an inorganic filler does not change with the passage of time and remains stable at all times. By using the inorganic filler, furthermore, the slipping property does not abruptly change that occurs when the slipping agent is added. Therefore, the slipping property is stably maintained at all times.

In the outermost layer of the bag of the present invention, fine ruggedness is formed in the surface due to the blending of the inorganic filler and, hence, the gloss is not larger than 50% and, particularly, not larger than 30% as measured in compliance with JIS Z 8741 (at a measuring angle of 60 degrees).

The innermost layer 3 plays the role of a stress carrier for imparting mechanical strength and impact strength necessary for the bags, imparts slipping property large enough for the contents to be packaged at high speeds, maintains easy heat-sealability and excellent heat-sealing strength, suppresses tendency of curling, and maintains the bag opened at the time of packaging the contents.

For this purpose, the innermost layer 3 contains the inorganic filler in an amount of from 10 to 40% by weight, which is from ½ to ⅙ and, particularly, from ½ to ¼ of the amount of the inorganic filler contained in the outermost layer. When the content of the inorganic filler in the innermost layer is smaller than the above-mentioned lower-limit value, the film curls making it no longer possible to maintain the shape of the mouth of the bag and, hence, no longer possible to package the contents at high speeds. When the above-mentioned upper-limit value is exceeded, on the other hand, the strength of the packaging bag and the heat-sealing strength are lost. The principal object of providing the innermost layer is to impart the strength. Therefore, the innermost layer contains the inorganic filler that lowers the strength in an amount smaller than that in the outermost layer. This holds true even for the heat-sealing property or the heat-sealing strength of the film.

In the present invention, the polyethylene film constituting the outermost layer and the innermost layer comprises an ethylene polymer or an ethylene copolymer. As the ethylene copolymer or as concrete examples of the ethylene copolymer, there can be used high-density polyethylene, medium-density polyethylene, low-density polyethylene, linear low-density polyethylene (ethylene/α-olefin copolymer), ethylene/vinyl acetate copolymer, ethylene/acrylic ester copolymer, and mixtures thereof. Among them, it is desired to use an ethylene/α-olefin copolymer having a substantially linear structure in which α-olefin has 5 or more carbon atoms and, particularly, 6 to 10 carbon atoms, and, particularly, an ethylene/α-olefin copolymer having a substantially linear structure in which α-olefin is 4-methylpentene-1, hexene-1 or octene-1 from the standpoint of obtaining a bag having excellent strength.

Though there is no particular limitation in the properties of the polyethylene constituting the film, the polyethylene used as the outermost layer has a melt flow rate (MFR (190° C.)) at a temperature of 190° C. of from 0.1 to 6.0 g/10 min. and, particularly, from 0.2 to 3.0 g/10 min., a density of from 0.900 to 0.925 $g/cm^3$ and, particularly, from 0.900 to 0.918 $g/cm^3$, and a molecular weight distribution as represented by weight average molecular weight Mw/number average molecular weight Mn of from 1.5 to 4.0 and, particularly, from 1.5 to 3.0.

When the MFR is smaller than the above-mentioned lower-limit value, the surface tends to become coarse to a considerable degree presenting poor appearance. When the MFR exceeds the above-mentioned upper-limit value, on the other hand, the strength tends to become small. When the density is smaller than the above-mentioned lower-limit value, furthermore, the blocking tends to occur. When the upper-limit value is exceeded, on the other hand, the strength decreases. When the molecular weight distribution is smaller than the above-mentioned lower-limit value, the surface is coarsened to a considerable degree presenting poor appearance. When the above-mentioned upper-limit value is exceeded, on the other hand, the strength decreases.

The bag having excellent strength is obtained when use is made of a polyethylene as the outermost layer, the polyethylene having a Dart impact strength of not smaller than 200 g and, particularly, not smaller than 300 g as measured as a 30 μm-thick film without containing inorganic filler.

By using the polyethylene having the aforementioned four properties which are all lying within the aforementioned ranges, it is allowed to obtain a packaging bag having the most excellent strength, appearance and anti-blocking property.

On the other hand, the polyethylene used as the innermost layer preferably has an MFR (190° C.) of from 0.1 to 1.0 g/10 min. and, particularly, from 0.2 to 0.8 g/10 min., a density of from 0.920 to 0.935 g/cm$^3$ and, particularly, from 0.920 to 0.930 g/cm$^3$, and a melt tension at 190° C. of not smaller than 4.0 g and, particularly, from 6.0 to 20 g.

When the MFR of the polyethylene of the innermost layer is smaller than the above-mentioned lower-limit value, increased load is exerted on a motor when the polyethylene is blended with other components, and the productivity decreases. When the upper-limit value is exceeded, on the other hand, the strength tends to decrease. When the density is smaller than the above-mentioned lower-limit value, the rigidity decreases. When the above-mentioned upper-limit value is exceeded, on the other hand, the strength tends to decrease. When the melt tension is smaller than the above-mentioned lower-limit value, the moldability relying upon the blown film molding decreases and it becomes difficult to form a film having a large thickness. When the upper limit is exceeded on the other hand, the molecular orientation becomes so large that the film can be elongated less particularly in the longitudinal direction.

The bag having excellent strength is obtained when use is made of a polyethylene as the innermost layer, the polyethylene having a Dart impact strength of not smaller than 100 g and, particularly, not smaller than 150 g as measured as a 30 μm-thick film without containing inorganic filler.

By using the polyethylene having the aforementioned four properties which are all lying within the aforementioned ranges, it is allowed to obtain a packaging bag having the most excellent rigidity, strength and moldability.

As for an optimum combination of the outermost polyethylene layer and the innermost polyethylene layer, it is desired that the innermost layer is composed of a polyethylene having large strength and impact strength and a relatively small MFR and that the outermost layer is composed of a polyethylene having good moldability and a relatively large MFR, since the innermost layer must serve as a stress carrier of the bag and the outermost layer appeals to the human eyes and must have well-ballanced slipping properties based upon fine ruggedness. It is desired that the polyethylene of the outermost layer has an MFR which is larger than that of the polyethylene of the innermost layer by more than 0.5 g/10 min.

According to the present invention, the inorganic filler is contained in the outermost layer to form microscopic ruggedness in the outer surface of the film in order to control slipping property on the outer surface of the film. The inorganic filler is further contained in the innermost layer to prevent the film from curling. Any inorganic filler can be used without any particular limitation provided it is capable of forming ruggedness in the surface of the film, such as talc, calcium carbonate, barium sulfate, zeolite, or the like.

Among them, talc or calcium carbonate, especially talc is desired since it is capable of forming a suitable degree of microscopic ruggedness and further makes it possible to obtain appearance like that of a paper. It is desired that the inorganic filler has a center particle diameter of from 1.5 to 7.0 μm and, particularly, from 2.0 to 5.0 μm as it permits the stacked bags to be collapsed little and makes it possible to obtain a packaging bag having excellent strength. The inorganic fillers added to the outermost layer and to the innermost layer may be the same or different.

The polyethylene constituting the outermost layer and the innermost layer may be blended with other additives in addition to the inorganic filler. For instance, the outermost layer may contain a heat stabilizer, a weather-proofing agent, a pigment, etc.

The innermost layer may be blended with an antistatic agent, a heat stabilizer, a weather-proofing agent, a pigment, etc. Among them, it is desired to blend the antistatic agent since it improves packaging performance. There can be used any antistatic agent without any limitation to prevent the thermoplastic resin film from being electrostatically charged, such as anionic agent, cationic agent, nonionic agent, amphoteric agent, or a mixture thereof. It is desired that the antistatic agent is contained in an amount of 500 to 3000 mg/kg with respect to the total weight of the polyethylene composition that constitutes the innermost layer.

As described above, the bag for packaging heavy materials of the present invention is made of a multi-layer polyethylene film in which are laminated, as the outermost layer and the innermost layer, polyethylene films of a polyethylene resin composition comprising the above-mentioned polyethylene, inorganic filler and, as required, other additives. The multi-layer polyethylene film may have two layers only, or may have one or more intermediate layers between the outermost layer and the innermost layer. Though there is no particular limitation, the intermediate layer may be a polyethylene layer without containing inorganic filler.

Desirably, the outermost layer has a thickness of from 15 to 60 μm and, particularly, from 20 to 40 μm.

Desirably, the innermost layer has a thickness of not smaller than 45 μm, and it is desired that the film thickness ratio represented by the thickness of the innermost layer/ thickness of the outermost layer is from 3 to 8 and, particularly, from 3 to 6. The principal object of providing the innermost layer is to impart strength, and it is desired that the thickness of the innermost layer is larger than the thickness of the outermost layer. By selecting the thicknesses of the layers to lie within the above-mentioned ranges, it is allowed to obtain a bag for packaging heavy materials having excellent strength. By selecting the thicknesses to lie within particularly preferred ranges, furthermore, it is allowed to obtain a bag for packaging heavy materials featuring improved strength at reasonable cost. The multi-layer polyethylene film will have a total thickness of not smaller than 60 μm. There is no particular upper limit. From the practical point of view, however, the upper limit in the total thickness of the multi-layer polyethylene film will be about 250 μm, but the thickness may be in excess of this value as a matter of course.

The packaging bag of the present invention can be preferably produced by the following method. First, the inorganic filler of the above-mentioned amount and, as required, other additives are directly mixed into the polyethylene by using a V-blender, a ribbon blender, Henschel's mixer or a tumbler blender, and the polyethylene composition for forming the outermost layer and the innermost layer is prepared by using an extruder, a kneader or Bumbury's mixer.

The polyethylene composition for the outermost layer is melt-kneaded by using the extruder for forming the outermost layer, the polyethylene composition for the innermost layer is melt-kneaded by using the extruder for forming the innermost layer and, when an intermediate layer is to be formed, the polyethylene for the intermediate layer is melt-kneaded by using the extruder for forming the intermediate layer. These compositions are then extruded through a multi-layer multiple die, and a tubular multi-layer polyethylene film is obtained by using an blown film-forming machine. The multi-layer polyethylene film is then cut into a suitable length, and the end surfaces that serve as a bottom are heat-sealed to obtain a bag. The inorganic filler and other additives may be added in advance as a master batch to the polyethylene.

The thus obtained packaging bags exhibit excellent strength, permit contents to be packaged at high speeds, and can be stacked at high speed, preventing themselves from collapsing during the storage or when being moved at high speeds. Therefore, the bags can be used for packaging heavy materials such as fertilizers, grains, chemicals, etc. in amounts of 5 to 30 kg.

According to the present invention as described above, the inorganic filler is contained in predetermined amounts in the outermost layer and in the innermost layer to form microscopic ruggedness in the surfaces of the outermost layer and the innermost layer to control the slipping property and to prevent the film from curling. Therefore, there are obtained bags for packaging heavy materials, the bags permitting the contents to be packaged at high speeds, being allowed to be stacked at high speeds, and without being collapsed while moving at high speeds or during the storage.

EXAMPLES

Examples of the present invention will now be described.

(Examples 1 to 3)

As the polyethylene of the outermost layer, use was made of an ethylene/4-methylpentene-1 copolymer of a linear structure having properties as shown in Table 1. As the inorganic filler to be blended in the outermost layer and in the innermost layer, talc or calcium carbonate was used. The talc possessed an average particle diameter of 3.0 μm, an oil-absorbing amount of 41 ml/100 g and a water content of 0.1%.

As the polyethylene of the innermost layer, use was made of an ethylene/4-methylpentene-1 copolymer of a linear structure having properties as shown in Table 1. The innermost layer was blended with an antistatic agent which was a mixture of Electrostripper TS-5/Electrostripper TS-2=1/1 manufactured by Kao Co.

The above-mentioned polyethylene, inorganic filler and antistatic agent were blended at ratios as shown in Table 1, mixed together for three minutes using Henschel's mixer having a capacity of 20 liters, and were granulated by using CIM having a diameter of 65 mm (biaxial extruder manufactured by Nippon Seiko Co.). Then, by using two extruders having diameters of 60 mm and 50 mm, and an blown film-forming machine consisting of a two-layer die having lip diameters of 200 mm and 2 mm, tubular films were obtained at a molding temperature (resin temperature at die outlet) of 210° C. having film thicknesses as shown in Table 1 (the total film thickness is 150 μm) and a folding width of 440 mm. The tubular films were cut into a length of 700 mm and the bottom portions were heat-sealed to obtain sample bags. The bags were subjected to various testings. The results were as shown in Table 1. Properties of the polyethylene resin were measured and tested as described below.

(1) MFR: In compliance with ASTM D-1238E.
(2) Density: In compliance with ASTM D-1505.
(3) Molecular weight distribution (Mw/Mn): Based upon a gel permeation chromatography (GPC) method.
(4) Melt tension: Measured by using a melt tension tester manufactured by Toyo Seiki Co. under the following conditions:

Nozzle used: L=8.000 mm, D=2.095 mm
Testing temperature: 190° C.
Take-up speed: 2 m/min.
Extrusion speed: 15 m/min.

(5) Dart impact strength: In compliance with ASTM D-1709.
(6) Coefficient of friction: Coefficient of static friction and coefficient of dynamic friction were measured on the surface of the outermost layer in compliance with ASTM D-1894.
(7) Gloss: In compliance with ASTMD 523-80 (at a measuring angle of 60 degrees).
(8) Curling property of the film: Evaluated on the following basis:

◎: No curling.
o: Very slightly curled.
Δ: Curled.
X: Curled to an extreme degree.

(9) Bag falling test: A bag packaged with 20 kg of a granular fertilizer was permitted to fall from a height of 2 meters in the vertical direction (sealed portions of the bag in the up-and-down direction), and the breaking degree of the bag was evaluated on the following basis:

◎: No problem.
o: Barrel portion is often elongated.
Δ: Bags are often broken.
X: Bags are all broken.

(10) Packaging performance: 20 Kg of a granular fertilizer was packaged by using a packaging machine 3CM manufactured by NEWLONG Co., and the packaging performance was evaluated on the following basis:

◎: No problem.
o: Packaging miss rarely happens.
Δ: Packaging miss often happens.
X: Packaging miss happens frequently.

(11) Stacking performance: Fifty bags each packaged with 20 kg of a granular fertilizer were stacked on a pallet by using a pelletizer, and the stacked state was evaluated on the following basis:

◎: No problem.
o: Defective stacking rarely occurs.
Δ: Defective stacking occurs.
X: Bags were stacked with difficulty.

(12) Collapse of stack while moving at high speeds: Fifty bags each packaged with 20 kg of a granular fertilizer were stacked on a pallet, and were carried by a fork lift at a speed of 35 km/h along a circle of a diameter of 10 meters, and the collapsing state was evaluated on the following basis:

⊚: No problem.
o: Collapses rarely.
Δ: Collapses frequently.
X: Bags collapsed and could not be carried.

(Comparative Examples 1 to 3)

Instead of the multi-layer polyethylene film of Example 1, a single-layer polyethylene film of an ethylene/4-methyl-pentene-1 copolymer (MFR=0.5 g/10 min, density of 0.925 g/cm$^3$) was tested in the same manner as in Example 1. The talc and the antistatic agent were the same as those of Example 1. The results were as shown in Table 2.

(Comparative Examples 4 to 9)

The procedure of Example 1 was repeated but changing the film thicknesses and the amount of the inorganic filler as shown in Tables 3 and 4. The results were as shown in Tables 3 and 4.

TABLE 1

|  | Example 1 | Example 2 | Example 3 |
|---|---|---|---|
| Outer Layer Resin |  |  |  |
| MFR (g/10 min) | 2.2 | 2.2 | 2.2 |
| Density (g/cm$^3$) | 0.915 | 0.915 | 0.915 |
| Mw/Mn | 2.3 | 2.3 | 2.3 |
| Film thickness (μm) | 30 | 50 | 90 |
| Inorganic filler | talc | talc | Ca carbonate |
| Amount added (% by wt.) | 40 | 60 | 40 |
| Inner layer Resin |  |  |  |
| MFR (g/10 min) | 0.5 | 0.5 | 0.5 |
| Density (g/cm$^3$) | 0.925 | 0.925 | 0.925 |
| Melt tension (g) | 10 | 10 | 10 |
| Inorganic filler | talc | talc | Ca carbonate |
| Amount added (% by wt.) | 15 | 12 | 15 |
| Amount of antistatic agent (ppm) | 1000 | 1000 | 1000 |
| Film thickness (μm) | 120 | 100 | 120 |
| Curling of film | ⊚ | ⊚ | ⊚ |
| Dart impact strength (g) | 780 | 800 | 760 |
| Bag falling test | ⊚ | ⊚ | ⊚ |
| Coefficient of static friction/coefficient of dynamic friction on the surface of outer layer | 0.60/0.46 | 0.57/0.47 | 0.57/0.45 |
| Gloss (%) | 20 | 18 | 40 |
| Packaging performance | ⊚ | ⊚ | ⊚ |
| Stacking performance | ⊚ | ⊚ | o |
| Collapsing when moving at high speeds | ⊚ | ⊚ | o |

TABLE 2

|  | Comparative Example 1 | Comparative Example 2 | Comparative Example 3 |
|---|---|---|---|
| Single-layer film |  |  |  |
| MFR of resin (g/10 min) | 0.5 | 0.5 | 0.5 |
| Density of resin (g/cm$^3$) | 0.925 | 0.925 | 0.925 |
| Amount of talc added (% by wt.) | — | — | 50 |
| Amount of antistatic agent (ppm) | 1500 | — | — |
| Film thickness (μm) | 150 | 150 | 150 |

TABLE 2-continued

|  | Comparative Example 1 | Comparative Example 2 | Comparative Example 3 |
|---|---|---|---|
| Curling of film | ⊚ | ⊚ | ⊚ |
| Dart impact strength (g) | 810 | 840 | 420 |
| Bag falling test | ⊚ | ⊚ | X |
| Coefficient of static friction/coefficient of dynamic friction on the surface of outer layer | 0.37/0.35 | 0.64/0.62 | 0.59/0.44 |
| Gloss (%) | 85 | 88 | 25 |
| Packaging performance | ⊚ | Δ | ⊚ |
| Stacking performance | ⊚ | X | ⊚ |
| Collapsing when moving at high speeds | X | ⊚ | ⊚ |

TABLE 3

|  | Comparative Example 4 | Comparative Example 5 | Comparative Example 6 |
|---|---|---|---|
| Outer Layer Resin |  |  |  |
| MFR (g/10 min) | 2.2 | 2.2 | 2.2 |
| Density (g/cm$^3$) | 0.915 | 0.915 | 0.915 |
| Mw/Mn | 2.3 | 2.3 | 2.3 |
| Film thickness (μm) | 10 | 80 | 30 |
| Inorganic filler | talc | talc | talc |
| Amount added (% by wt.) | 40 | 70 | 40 |
| Inner layer Resin |  |  |  |
| MFR (g/10 min) | 0.5 | 0.5 | 0.5 |
| Density (g/cm$^3$) | 0.925 | 0.925 | 0.925 |
| Melt tension (g) | 10 | 10 | 10 |
| Inorganic filler | talc | talc | talc |
| Amount added (% by wt.) | 15 | 12 | 5 |
| Amount of antistatic agent (ppm) | 1000 | 1000 | 1000 |
| Film thickness (μm) | 140 | 70 | 120 |
| Curling of film | ⊚ | Δ | X |
| Dart impact strength (g) | 880 | 550 | 910 |
| Bag falling test | ⊚ | Δ | ⊚ |
| Coefficient of static friction/coefficient of dynamic friction on the surface of outer layer | 0.60/0.58 | 0.57/0.45 | 0.57/0.45 |
| Gloss (%) | 55 | 19 | 20 |
| Packaging performance | Δ | ⊚ | Δ*1 |
| Stacking performance | Δ | ⊚ | ⊚ |
| Collapsing when moving at high speeds | ⊚ | ⊚ | ⊚ |

*1 Bag opened poorly due to curling

TABLE 4

|  | Comparative Example 7 | Comparative Example 8 | Comparative Example 9 |
|---|---|---|---|
| Outer Layer Resin |  |  |  |
| MFR (g/10 min) | 2.2 | 2.2 | 2.2 |
| Density (g/cm$^3$) | 0.915 | 0.915 | 0.915 |
| Mw/Mn | 2.3 | 2.3 | 2.3 |
| Film thickness (μm) | 30 | 30 | 30 |

TABLE 4-continued

|  | Comparative Example 7 | Comparative Example 8 | Comparative Example 9 |
|---|---|---|---|
| Inorganic filler | talc | talc | talc |
| Amount added (% by wt.) | 40 | 85 | 15 |
| Inner layer |  |  |  |
| Resin |  |  |  |
| MFR (g/10 min) | 0.5 | 0.5 | 0.5 |
| Density (g/cm³) | 0.925 | 0.925 | 0.925 |
| Melt tension (g) | 10 | 10 | 10 |
| Inorganic filler | talc | talc | talc |
| Amount added (% by wt.) | 30 | 40 | 5 |
| Amount of antistatic agent (ppm) | 1000 | 1000 | 1000 |
| Film thickness (μm) | 120 | 120 | 120 |
| Curling of film | ⊚ | ⊚ | ⊚ |
| Dart impact strength (g) | 450 | 440 | 910 |
| Bag falling test | X | X | ⊚ |
| Coefficient of static friction/coefficient of dynamic friction on the surface of outer layer | 0.57/0.46 | 0.54/0.43 | 0.61/0.59 |
| Gloss (%) | 18 | 14 | 61 |
| Packaging performance | ⊚ | ⊚ | Δ |
| Stacking performance | ⊚ | ⊚ | X |
| Collapsing when moving at high speeds | ⊚ | ⊚ | ⊚ |

The following facts will be understood from the above results.

With the bags made of a single-layer film without containing inorganic filler (Comparative Examples 1 and 2), it is difficult to satisfy all of the requirements such as content packaging performance, stacking performance and anti-collapsing performance. In the case of a bag (Comparative Example 3) made of a single-layer film blended with the inorganic filler so as to satisfy the above-mentioned requirements, on the other hand, the strength and the impact strength are deteriorated to a considerable degree.

Even in the case of a bag made of a multi-layer film of an inorganic filler-containing polyethylene but in which the amount of the filler in the innermost layer is smaller than the range specified by the present invention (Comparative Example 6), the film curled to a large degree and the bag poorly opened at the time of packaging the content.

When the amount of the filler in the outermost layer is larger than the range specified by the present invention (Comparative Example 8) or when the ratio of the content of the filler in the innermost layer to the outside the range of the present invention (Comparative Example 7), the bag exhibits markedly decreased strength and impact strength.

When the coefficient of friction and gloss of the outermost layer lie outside the range of the present invention (Comparative Examples 4 and 9), furthermore, it becomes difficult to satisfy both the stacking performance and anti-collapsing performance.

In the case of the bags in which the fillers are contained in the outermost layer and in the innermost layer in amounts as specified by the present invention and the coefficient of friction of the outermost layer is set to a predetermined value (Examples 1 to 3), on the other hand, satisfactory results are obtained with regard to all of strength, content packaging performance, stacking performance and anti-collapsing performance.

We claim:

1. A bag with sufficient strength for packaging heavy materials comprising a multi-layer laminated film comprising:
   (1) an outermost layer of a polyethylene film having a thickness of from 15 to 60 μm and containing an inorganic filler in an amount of from 20 to 80% by weight; and
   (2) an innermost layer of a polyethylene film having a thickness of not less than 45 μm and containing an inorganic filler in an amount of from 10 to 40% by weight;
   wherein the polyethylene of the outermost layer (1) has a melt flow rate at 190° C. of from 0.1 to 6.0 g/10 min., a density of from 0.900 to 0.925 g/m³, and a molecular weight distribution as represented by the ratio of weight average molecular weight Mw to number average molecular weight Mn, of from 1.5 to 4.0, and the surface of the outermost layer (1) has a coefficient of static friction of not less than 0.5 (ASTM D 1894), a coefficient of dynamic friction of not greater than 0.5 (ASTM D1894), a gloss of not greater than 50% (ASTM D 523-80); and
   the polyethylene of the innermost layer (2) has melt flow rate at 190° C. of from 0.1 to 1.0 g/10 min, a density of from 0.920 to 0.935 g/cm³, and a melt tension at 190° C. of not less than 4.0 g, and the amount of the inorganic filler in the innermost layer is ½ to ⅙ by weight of the amount of the inorganic filler in the outermost layer and the ratio of the thickness of the innermost layer to the thickness of the outer layer is from 3 to 8.

2. The bag for packaging heavy materials according to claim 1, wherein said coefficient of static friction is not less than 0.55, said coefficient of dynamic friction is not greater than 0.48 and said gloss is not greater than 30%.

3. The bag for packaging heavy materials according to claim 1 or claim 2, wherein the polyethylene of the polyethylene films of the outermost layer (1) and the innermost layer (2) is a copolymer of ethylene and an alpha-olefin having not fewer than 5 carbon atoms, and has a linear structure.

4. A bag with sufficient strength for packaging heavy materials made of a multi-layer polyethylene film having at least two layers, comprising
   an outermost layer of polyethylene having a thickness of from 15 to 60 μm and comprising an inorganic filler in an amount of from 20 to 80% by weight; and
   an innermost layer of polyethylene having a thickness of not less than 45 μm and comprising an inorganic filler in an amount of from 10 to 40% by weight;
   wherein the polyethylene of the outermost layer has a melt flow rate at 190° C. of from 0.1 to 6.0 g/10 min., a density of from 0.900 to 0.925 g/cm³, and a molecular weight distribution as represented by the ratio of weight average molecular weight Mw to number average molecular weight Mn of from 1.5 to 4.0, and the surface of the outermost layer has a coefficient of static friction of not less that 0.5 (ASTM D 1894), a coefficient of dynamic friction of not greater that 0.5 (ASTM D 1894), and a gloss of not greater than 50% (ASTM D 523-80);
   the polyethylene of the innermost layer has a melt flow rate at 190° C. of from 0.1 to 1.0 g/10 min., a density of from 0.920 to 0.935 g/cm³, a melt tension at 190° C. of not less than 4.0 g; the amount of the inorganic filler in the innermost layer is from ½ to ⅙ by weight of the amount of the inorganic filler in the outermost layer; and the ratio of the thickness of the innermost layer to the thickness of the outermost layer is from 3 to 8.

5. The bag for packaging heavy materials according to claim 4, wherein said multi-layer polyethylene film comprises a copolymer having a linear structure, of ethylene and an alpha-olefin having not fewer than 5 carbon atoms;

the outermost layer has a thickness of from 20 to 40 μm and the inorganic filler in the outermost layer comprises talc or calcium carbonate in an amount of from 25 to 70% by weight;

the innermost layer has a thickness of not less than 45 μm and the inorganic filler in the innermost layer comprises talc or calcium carbonate in an amount of from 10 to 40% by weight;

wherein the amount of the talc or calcium carbonate in the innermost layer is from ½ to ¼ by weight of the amount of the talc or calcium carbonate in the outermost layer, and the ratio of the thickness of the innermost layer to the thickness of the outermost layer is from 3 to 6.

* * * * *